United States Patent
Shiraishi

(10) Patent No.: US 10,021,275 B2
(45) Date of Patent: Jul. 10, 2018

(54) IMAGE PROCESSING APPARATUS, METHOD OF CONTROLLING IMAGE PROCESSING APPARATUS, AND NON-TRANSITORY RECORDING MEDIUM

(71) Applicant: Naoto Shiraishi, Kanagawa (JP)

(72) Inventor: Naoto Shiraishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 50 days.

(21) Appl. No.: 15/056,946

(22) Filed: Feb. 29, 2016

(65) Prior Publication Data

US 2016/0277641 A1  Sep. 22, 2016

(30) Foreign Application Priority Data

Mar. 20, 2015 (JP) .................... 2015058625

(51) Int. Cl.
- *H04N 1/60* (2006.01)
- *H04N 1/21* (2006.01)
- *H04N 1/00* (2006.01)
- *G06T 11/60* (2006.01)

(52) U.S. Cl.
CPC ........... *H04N 1/6027* (2013.01); *G06T 11/60* (2013.01); *H04N 1/00204* (2013.01); *H04N 1/2104* (2013.01); *H04N 2201/0094* (2013.01)

(58) Field of Classification Search
None
See application file for complete search history.

(56) References Cited

U.S. PATENT DOCUMENTS

| 2012/0114230 A1* | 5/2012 | Dai ................... G06K 9/00456 382/164 |
| 2013/0148847 A1* | 6/2013 | Wang .................. G06K 9/2018 382/103 |
| 2014/0146083 A1* | 5/2014 | Yamaguchi ........... G06T 19/006 345/633 |

FOREIGN PATENT DOCUMENTS

| JP | 2008-023959 | 2/2008 |
| JP | 2010-046836 | 3/2010 |
| JP | 2014-165545 | 9/2014 |

\* cited by examiner

*Primary Examiner* — Lennin Rodriguezgonzalez

(74) *Attorney, Agent, or Firm* — Duft Bornsen & Fettig LLP

(57) ABSTRACT

An image processing apparatus includes a control circuit and an image processing circuit. The control circuit divides a target image stored in a memory into predetermined units to generate a plurality of block image, generates rendering determination information for each of the plurality of block images, and stores the rendering determination information in the memory. The rendering determination information indicates whether the block image has a pixel value to be rendered. The image processing circuit acquires the generated rendering determination information for at least one block image of the target image from the memory, acquires, if the rendering determination information indicates that the block image has the pixel value to be rendered, the block image corresponding to the rendering determination information from the memory, and performs image processing on the acquired target image to generate rendering information for rendering the target image.

15 Claims, 15 Drawing Sheets

FIG. 7

| PIXEL (0, 0) | PIXEL (1, 0) | ... | PIXEL (7, 0) | PIXEL (8, 0) | PIXEL (9, 0) | ... | PIXEL (15, 0) | PIXEL (16, 0) | PIXEL (17, 0) | ... | PIXEL (23, 0) |
| PIXEL (0, 1) | PIXEL (1, 1) | ... | PIXEL (7, 1) | PIXEL (8, 1) | PIXEL (9, 1) | ... | PIXEL (15, 1) | PIXEL (16, 1) | PIXEL (17, 1) | ... | PIXEL (23, 1) |
| PIXEL (0, 2) | PIXEL (1, 2) | ... | PIXEL (7, 2) | PIXEL (8, 2) | PIXEL (9, 2) | ... | PIXEL (15, 2) | PIXEL (16, 2) | PIXEL (17, 2) | ... | PIXEL (23, 2) |

FIG. 8

| PIXEL (0, 0)–(7, 0) VALIDITY FLAG | PIXEL (8, 0)–(15, 0) VALIDITY FLAG | PIXEL (16, 0)–(23, 0) VALIDITY FLAG |
|---|---|---|
| PIXEL (0, 1)–(7, 1) VALIDITY FLAG | PIXEL (8, 1)–(15, 1) VALIDITY FLAG | PIXEL (16, 1)–(23, 1) VALIDITY FLAG |
| PIXEL (0, 2)–(7, 2) VALIDITY FLAG | PIXEL (8, 2)–(15, 2) VALIDITY FLAG | PIXEL (16, 2)–(23, 2) VALIDITY FLAG |

FIG. 9

| PIXEL (0,0) | PIXEL (1,0) | ... | PIXEL (7,0) | PIXEL (8,0) | PIXEL (9,0) | ... | PIXEL (15,0) | PIXEL (16,0) | PIXEL (17,0) | PIXEL (18,0) | PIXEL (19,0) | NOP | NOP | NOP |
|---|---|---|---|---|---|---|---|---|---|---|---|---|---|---|
| PIXEL (0,1) | PIXEL (1,1) | ... | PIXEL (7,1) | PIXEL (8,1) | PIXEL (9,1) | ... | PIXEL (15,1) | PIXEL (16,1) | PIXEL (17,1) | PIXEL (18,1) | PIXEL (19,1) | NOP | NOP | NOP |
| PIXEL (0,2) | PIXEL (1,2) | ... | PIXEL (7,2) | PIXEL (8,2) | PIXEL (9,2) | ... | PIXEL (15,2) | PIXEL (16,2) | PIXEL (17,2) | PIXEL (18,2) | PIXEL (19,2) | NOP | NOP | NOP |

FIG. 10

| PIXEL (0,0)–(7,0) VALIDITY FLAG | PIXEL (8,0)–(15,0) VALIDITY FLAG | PIXEL (16,0)–(19,0) VALIDITY FLAG |
|---|---|---|
| PIXEL (0,1)–(7,1) VALIDITY FLAG | PIXEL (8,1)–(15,1) VALIDITY FLAG | PIXEL (16,1)–(19,1) VALIDITY FLAG |
| PIXEL (0,2)–(7,2) VALIDITY FLAG | PIXEL (8,2)–(15,2) VALIDITY FLAG | PIXEL (16,2)–(19,2) VALIDITY FLAG |

FIG. 17

FIG. 18

IMAGE PROCESSING APPARATUS, METHOD OF CONTROLLING IMAGE PROCESSING APPARATUS, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2015-058625 filed on Mar. 20, 2015, in the Japan Patent Office, the entire disclosure of which is hereby incorporated by reference herein.

BACKGROUND

Technical Field

This disclosure relates to an image processing apparatus, a method of controlling an image processing apparatus, and a non-transitory recording medium.

Related Art

With digitization of information promoted in recent years, an image processing apparatus, such as a printer or a facsimile machine used to output digitized information or a scanner used to digitize documents, has been widely used. Such an image processing apparatus is often provided with functions such as imaging, image formation, and communication to be configured as a multifunction peripheral (MFP) usable as a printer, a facsimile machine, a scanner, and a copier.

The above-described image processing apparatus includes a device dedicated to image processing, such as a dedicated arithmetic device configured as an application specific integrated circuit (ASIC), for example. For instance, the ASIC dedicated to image processing (hereinafter referred to as the image processing ASIC) acquires a multi-gradation, multi-valued image in red, green, and blue (RGB) colors stored in a main memory via a bus such as Peripheral Component Interconnect Express (PCI Express; registered trademark). The image processing ASIC further performs image processing, such as color conversion and gradation processing, on the acquired multivalued image, to generate rendering information for rendering an image to be formed in an image forming operation by a print engine mounted in the image processing apparatus.

To increase the speed of image processing by such an image processing ASIC, the multivalued image stored in the main memory may be read in units of lines to be subjected to image processing such as color conversion and gradation processing.

SUMMARY

In one embodiment of this disclosure, there is provided an improved image processing apparatus that includes, for example, a control circuit and an image processing circuit. The control circuit divides a target image stored in a memory into predetermined units to generate a plurality of block image, generates rendering determination information for each of the plurality of block images, and stores the rendering determination information in the memory. The rendering determination information indicates whether the block image has a pixel value to be rendered. The image processing circuit acquires the generated rendering determination information for at least one block image of the target image from the memory, acquire, if the rendering determination information indicates that the block image has the pixel value to be rendered, the block image corresponding to the rendering determination information from the memory, and performs image processing on the acquired target image to generate rendering information for rendering the target image.

In one embodiment of this disclosure, there is provided an improved method of controlling an image processing apparatus. The method includes, for example, dividing a target image stored in a memory into predetermined units to generate a plurality of block images, generating, for each of the plurality of block images, rendering determination information indicating whether the block image has a pixel value to be rendered, storing the rendering determination information in the memory, acquiring the generated rendering determination information for at least one block image of the target image from the memory, acquiring, if the rendering determination information indicates that the block image has the pixel value to be rendered, the block image corresponding to the rendering determination information from the memory, and performing image processing on the acquired target image to generate rendering information for rendering the target image.

In one embodiment of this disclosure, there is provided a non-transitory recording medium storing a program for causing a computer to execute the above-described method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a diagram illustrating an example of an RGB image stored in a multivalued image storage unit in the main control unit according to the embodiment;

FIG. 8 is a diagram illustrating an example of validity flags stored in a validity flag storage unit in the main control unit according to the embodiment;

FIG. 9 is a diagram illustrating an example of the RGB image stored in the multivalued image storage unit according to the embodiment;

FIG. 10 is a diagram illustrating an example of the validity flags stored in the validity flag storage unit according to the embodiment;

FIG. 17 is a diagram illustrating an example of the RGB image according to the embodiment;

FIG. 18 is a diagram illustrating an example of the validity flags according to the embodiment;

Figure 1:
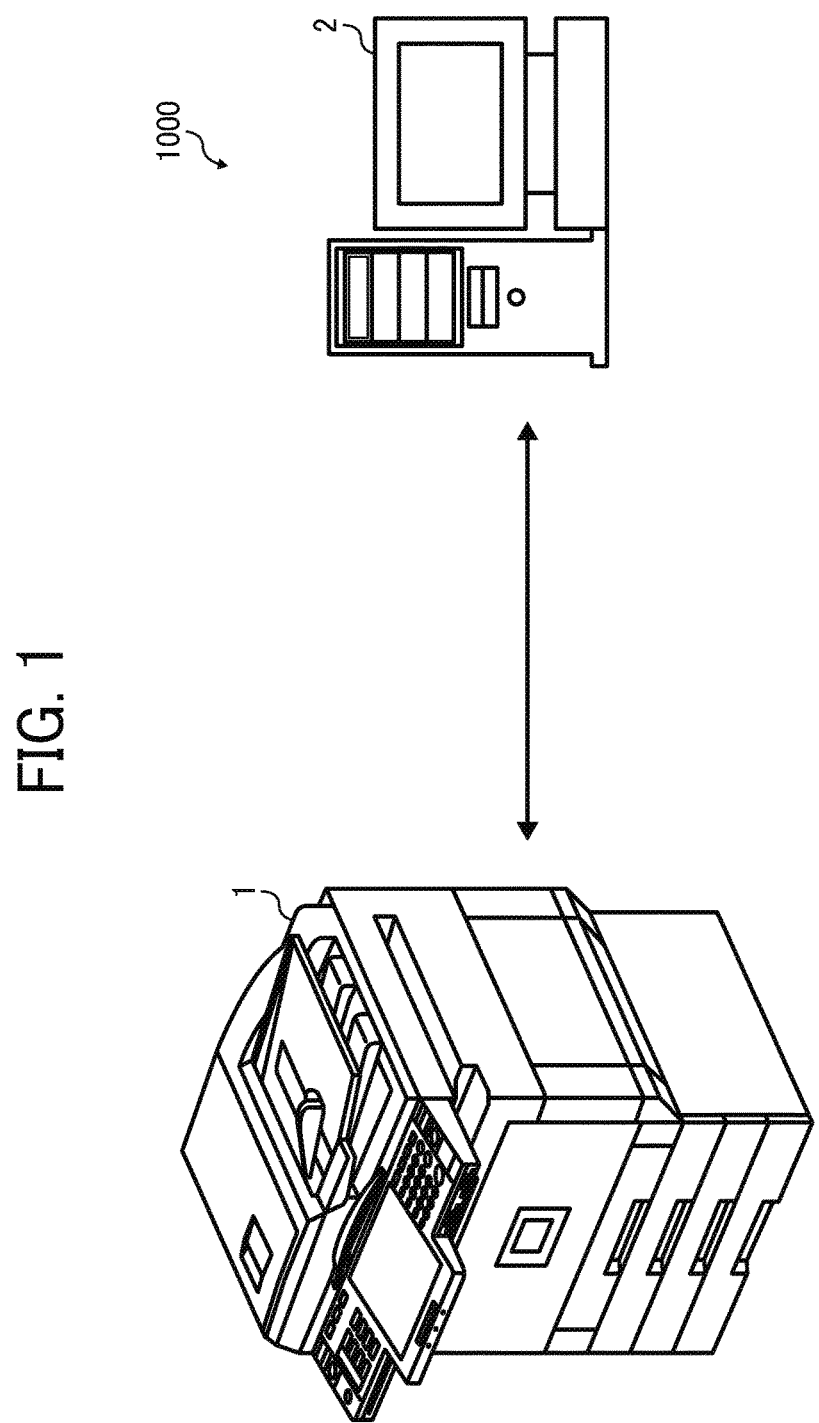
FIG. 1 is a diagram illustrating an example form of operation of an image processing system according to an embodiment of this disclosure.

The accompanying drawings are intended to depict example embodiments of this disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same function, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, wherein like reference numerals designate identical or corresponding parts throughout the several views, an embodiment of this disclosure will be described in detail. In the present embodiment, a description will be given of, for example, an image processing system including an image processing apparatus and a client terminal that uses the image processing apparatus.

FIG. 1 is a diagram illustrating an example form of operation of an image processing system 1000 according to the embodiment. As illustrated in FIG. 1, the image processing system 1000 according to the embodiment includes an image processing apparatus 1 and a client terminal 2 communicably connected to each other.

The image processing apparatus 1 has functions such as imaging, image formation, and communication to serve as a multifunction peripheral (MFP) usable as a printer, a facsimile machine, a scanner, and a copier.

The client terminal 2 is a user interface for using the image processing system 1000 according to the embodiment. The client terminal 2 is a personal computer (PC) having a common information processing function, and is implemented by a software program installed therein to realize a graphical user interface (GUI) and so forth.

Figure 2:
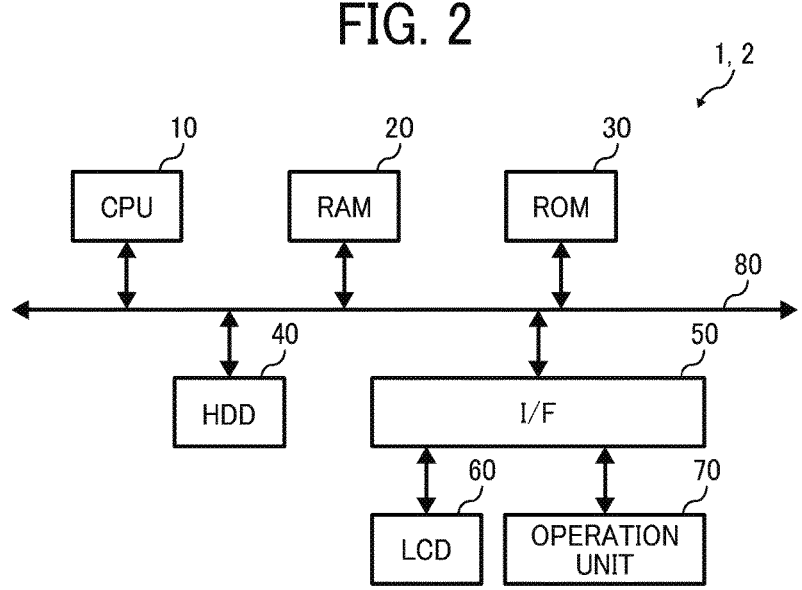
FIG. 2 is a block diagram illustrating an example hardware configuration of an image processing apparatus in the image processing system according to the embodiment.

FIG. 2 is a block diagram illustrating an example hardware configuration of the image processing apparatus 1 according to the embodiment. FIG. 2 also illustrates an example hardware configuration of the client terminal 2 according to the embodiment. As illustrated in FIG. 2, the image processing apparatus 1 according to the embodiment has a configuration similar to that of a common server or PC.

The image processing apparatus 1 according to the embodiment includes a central processing unit (CPU) 10, a random access memory (RAM) 20, a read-only memory (ROM) 30, a hard disk drive (HDD) 40, and an interface (I/F) 50 connected to one another via a bus 80. The I/F 50 is connected to a liquid crystal display (LCD) 60 and an operation unit 70.

The image processing apparatus 1 further includes dedicated devices for performing image formation and output and scanning. For example, the dedicated devices include a transport mechanism that transports a sheet onto which an image is to be formed and output, a plotter that forms and outputs the image on the sheet, a reading device that reads the image output on the sheet, and an arithmetic device dedicated to high-speed image processing and configured as an application specific integrated circuit (ASIC), for example.

The CPU 10 is an arithmetic device that controls the operation of the entire image processing apparatus 1. The RAM 20 is a volatile storage medium capable of reading and writing information at high speed and used as a work area in information processing by the CPU 10. The ROM 30 is a read-only non-volatile storage medium that stores programs such as firmware. The HDD 40 is a non-volatile storage medium capable of reading and writing information, and stores an operating system (OS), a variety of control programs, application programs, and so forth. The HDD 40 may be replaced by a semiconductor storage device such as a solid state drive (SSD).

The I/F 50 connects and controls the bus 80, a variety of hardware components, a network, and so forth. The LCD 60 is a visual user interface for allowing the status of the image processing apparatus 1 to be visually checked. The operation unit 70, which includes a keyboard, a mouse, a variety of hardware buttons, and a touch panel, is a user interface for allowing input of information to the image processing apparatus 1.

In the above-described hardware configuration, the CPU 10 performs arithmetic operations in accordance with programs read into the RAM 20 from a memory such as the ROM 30, the HDD 40, or an optical disc, to thereby configure a software control unit. The thus-configured software control unit and hardware cooperate to form functional blocks that realize functions of the image processing apparatus 1 according to the embodiment.

The functions of the image processing apparatus 1 according to the embodiment will now be described.

Figure 3:
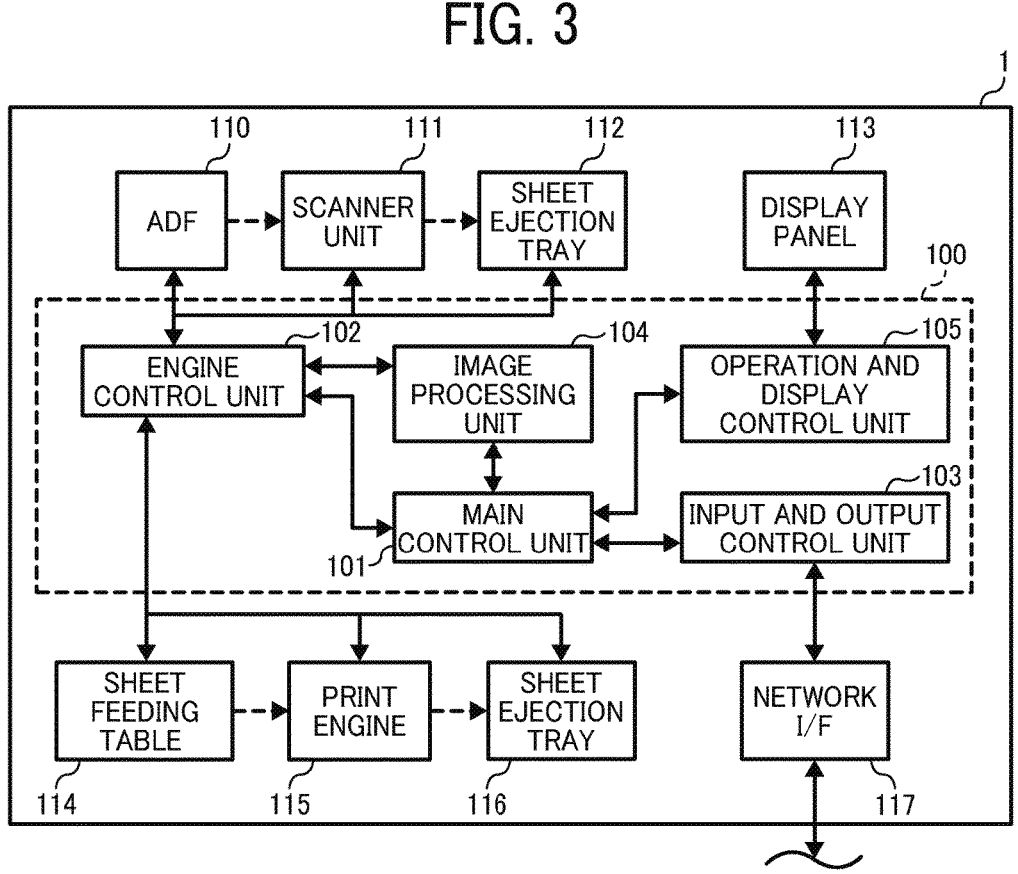
FIG. 3 is a block diagram illustrating an example functional configuration of the image processing apparatus according to the embodiment.

FIG. 3 is a block diagram illustrating an example functional configuration of the image processing apparatus 1 according to the embodiment. As illustrated in FIG. 3, the image processing apparatus 1 according to the embodiment includes a controller 100, an automatic document feeder (ADF) 110, a scanner unit 111, a sheet ejection tray 112, a display panel 113, a sheet feeding table 114, a print engine 115, a sheet ejection tray 116, and a network I/F 117.

The controller 100 includes a main control unit 101, an engine control unit 102, an input and output control unit 103, an image processing unit 104, and an operation and display control unit 105. As illustrated in FIG. 3, the image processing apparatus 1 according to the embodiment is configured as a MFP including the scanner unit 111 and the print engine 115. In FIG. 3, solid arrows indicate electrical connections, and broken arrows indicate flows of sheets.

The display panel 113 serves as both an output interface that visually displays the status of the image processing apparatus 1 and an input interface (i.e., an operation unit) used as a touch panel to directly operate the image processing apparatus 1 or input information to the image processing apparatus 1. The network I/F 117 is an interface for allowing the image processing apparatus 1 to communicate with an external device via a network, and may be an interface conforming to Ethernet (registered trademark), universal serial bus (USB), Bluetooth (registered trademark), or wireless fidelity (Wi-Fi), for example.

The controller 100 is a combination of software and hardware. Specifically, the controller 100 is formed of hardware such as integrated circuits and the foregoing software control unit formed of the CPU 10 performing arithmetic operations in accordance with control programs such as firmware loaded to the RAM 20 from a non-volatile storage medium such as the ROM 30 or the HDD 40. The controller 100 functions as a control unit that controls the entire image processing apparatus 1.

The main control unit 101 (i.e., a control circuit) controls the units included in the controller 100, and issues commands to the units of the controller 100. The engine control unit 102 serves as a driver that controls or drives units such as the print engine 115 and the scanner unit 111. The input and output control unit 103 inputs to the main control unit 101 signals and commands input from an information processor or the like connected to the image processing apparatus 1 via the network I/F 117. Further, the input and output control unit 103 is controlled by the main control unit 101 to access the external device via the network I/F 117.

In accordance with the control of the main control unit 101, the image processing unit 104 (i.e., an image processing circuit) generates rendering information based on image information to be printed out. The image processing unit 104 of the embodiment is a dedicated arithmetic device (i.e., dedicated engine) configured as an ASIC or a field programmable gate array (FPGA). The image information to be printed out is data in page description language (PDL) format such as Portable Document Format (PDF) or PostScript (PS).

In the embodiment, the main control unit 101 generates a multi-gradation, multivalued image in red, green, and blue (RGB) colors, i.e., three primary colors, based on the PDL information (hereinafter referred to as the RGB image), and stores the RGB image in, for example, the RAM 20 serving as a main memory.

The process of generating the RGB image may also generate intermediate data (i.e., intermediate language) through various processes based on the PDL information. In this case, therefore, the main control unit 101 functions as an intermediate language generation unit that generates the intermediate language, which is stored in an intermediate language storage unit provided in the RAM 20. The above-described RGB image and intermediate data are used to form and output an image onto a sheet.

In accordance with the control of the main control unit 101, the image processing unit 104 accesses the RAM 20 via the bus 80, acquires the RGB image from the RAM 20, and generates the rendering information based on the acquired RGB image. The rendering information is for rendering an image to be formed in an image forming operation by the print engine 115 serving as an image forming and outputting unit. According to the present embodiment, the image processing unit 104 performs image processing by acquiring the RGB image at high speed in accordance with the control of the main control unit 101. The configuration of the main control unit 101 and the image processing unit 104 for acquiring the RGB image at high speed will be described later.

The image processing unit 104 further processes imaging data input from the scanner unit 111 to generate image data. The image data is information stored in the image processing apparatus 1 or transmitted to the external device via the network I/F 117 as the outcome of a scanning operation. The operation and display control unit 105 displays information on the display panel 113 or notifies the main control unit 101 of information input via the display panel 113.

The image processing apparatus 1 may be configured to have only the print function. In this case, the ADF 110, the scanner unit 111, and the sheet ejection tray 112 illustrated in FIG. 3 are omitted. Accordingly, a function of the engine control unit 102 to control the ADF 110, the scanner unit 111, and the sheet ejection tray 112 is also omitted.

When the image processing apparatus 1 operates as a printer, the input and output control unit 103 first receives a print job from the client terminal 2 or the like via the network I/F 117. The input and output control unit 103 transfers the received print job to the main control unit 101. The main control unit 101 receives the print job and controls the image processing unit 104 to generate the rendering information based on text information or image information included in the print job.

After the image processing unit 104 generates the rendering information, the engine control unit 102 executes image formation on a sheet, i.e., a recording medium, transported from the sheet feeding table 114 based on the generated rendering information. The recording medium may be paper, a film, a plastic sheet, or any other sheet material capable of carrying an image formed thereon. The print engine 115 may specifically be an inkjet image forming mechanism or an electrophotographic image forming mechanism, for example. The sheet subjected to the image formation by the print engine 115 is ejected to the sheet ejection tray 116.

When the image processing apparatus 1 operates as a scanner, i.e., an image reading device, the operation and display control unit 105 or the input and output control unit 103 transmits a scanning execution signal to the main control unit 101 in accordance with a scanning execution instruction input through the operation of the display panel 113 or input from the external device via the network I/F 117. The main control unit 101 controls the engine control unit 102 based on the received scanning execution signal.

The engine control unit 102 drives the ADF 110 to transport a document set on the ADF 110 as an imaging target to the scanner unit 111 and then to the sheet ejection tray 112. The engine control unit 102 further drives the scanner unit 111 to image the document transported to the scanner unit 111 from the ADF 110. If the document is set not on the ADF 110 but directly on the scanner unit 111, the scanner unit 111 images the thus-set document in accordance with the control of the engine control unit 102. That is, the scanner unit 111 operates as an imaging unit.

In the imaging operation, an imaging device such as a charge coupled device (CCD) included in the scanner unit 111 optically scans the document to generate imaging information based on optical information. The engine control unit 102 transmits the imaging information generated by the scanner unit 111 to the image processing unit 104.

In accordance with the control of the main control unit 101, the image processing unit 104 generates image information based on the imaging information received from the engine control unit 102. The image information generated by the image processing unit 104 is stored in a memory provided in the image processing apparatus 1, such as the HDD 40, or transmitted to the external device via the network I/F 117 by the input and output control unit 103 in accordance with an instruction input to the image processing apparatus 1.

When the image processing apparatus 1 operates as a copier, the image processing unit 104 generates rendering information based on the imaging information received from the scanner unit 111 by the engine control unit 102 or the image information generated by the image processing unit 104. The engine control unit 102 then drives the print engine 115 based on the rendering information in a similar manner as in the printer operation.

A description will now be given of a function of the main control unit 101 according to the embodiment related to the acquisition of the RGB image via the bus 80 by the image processing unit 104.

Figure 4:
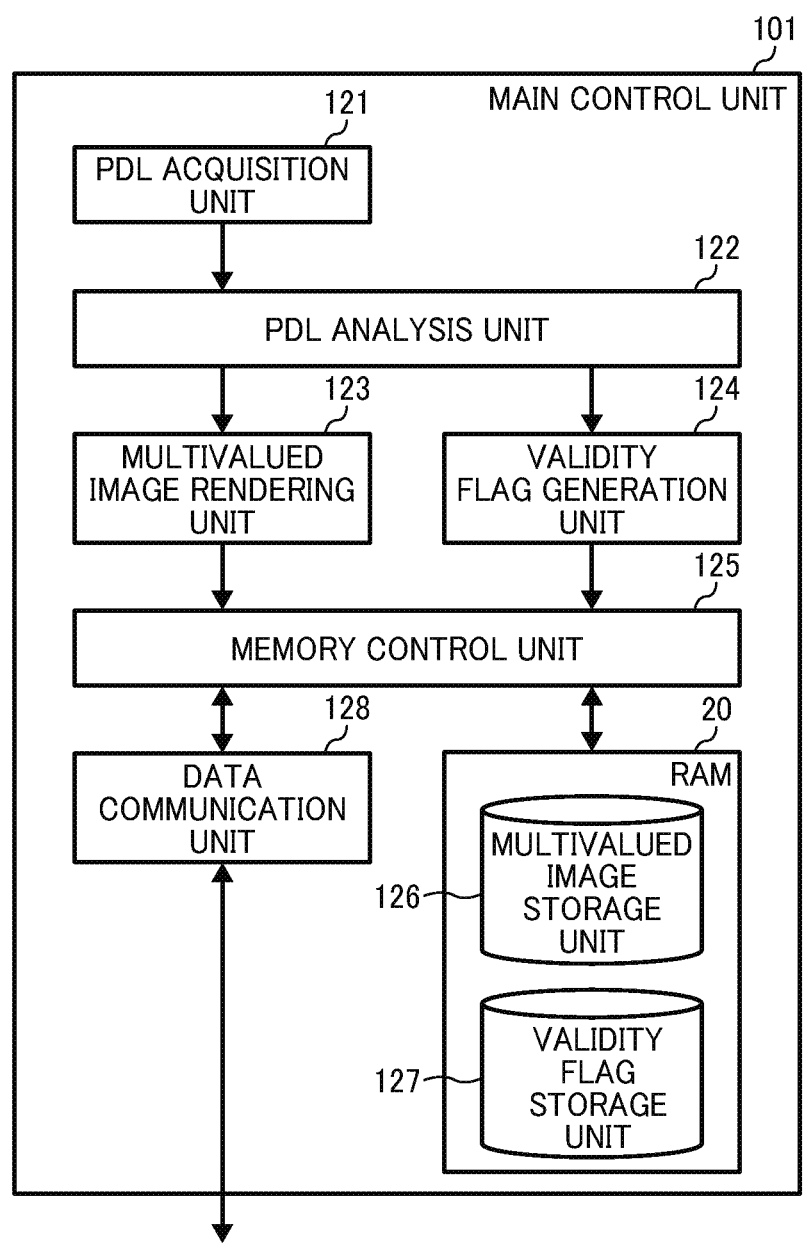
FIG. 4 is a block diagram illustrating an example functional configuration of a main control unit in the image processing apparatus according to the embodiment.

FIG. 4 is a block diagram illustrating an example functional configuration of the main control unit 101 according to the embodiment related to the acquisition of the RGB image via the bus 80 by the image processing unit 104.

As illustrated in FIG. 4, the main control unit 101 according to the embodiment includes a PDL acquisition unit 121, a PDL analysis unit 122, a multivalued image rendering unit 123, a validity flag generation unit 124, a memory control unit 125, a multivalued image storage unit 126, a validity flag storage unit 127, and a data communication unit 128. The multivalued image storage unit 126 and the validity flag storage unit 127 are storage areas allocated in the RAM 20.

The PDL acquisition unit 121 acquires the PDL-format image information generated in the client terminal 2 to be printed out (hereinafter referred to as the PDL information), and outputs the PDL information to the PDL analysis unit 122. The PDL analysis unit 122 analyses the PDL information input from the PDL acquisition unit 121, and outputs a command to render an RGB image to the multivalued image rendering unit 123 based on the analysis result of the PDL information. The PDL analysis unit 122 further outputs image configuration information, which represents the positions and so forth of pixels of the RGB image to be rendered by the multivalued image rendering unit 123, to the validity flag generation unit 124 based on the analysis result of the PDL information.

The multivalued image rendering unit 123 renders the RGB image in accordance with the rendering command input from the PDL analysis unit 122, and stores the rendered RGB image in the multivalued image storage unit 126 in accordance with the control of the memory control unit 125.

Figure 5:
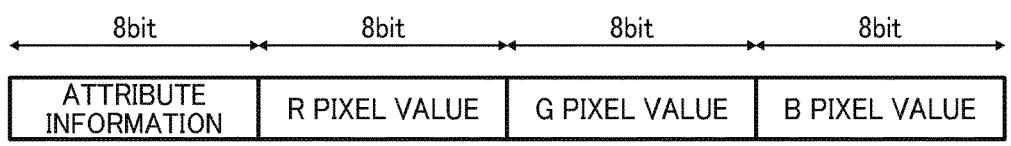
FIG. 5 is a diagram illustrating an example format of an RGB image rendered by a multivalued image rendering unit in the main control unit according to the embodiment.

FIG. 5 is a diagram illustrating an example format of the RGB image rendered by the multivalued image rendering unit 123. As illustrated in FIG. 5, the RGB image is formed of attribute information, a pixel value of red (R), a pixel value of green (G), and a pixel value of blue (B), each of which has 8 bits. That is, the RGB image is formed of 32 bits in total. The attribute information represents the type of the RGB image, such as photo image or computer graphics image.

Based on the image configuration information input from the PDL analysis unit 122, the validity flag generation unit 124 generates a validity flag for each of block images obtained by dividing the RGB image rendered by the multivalued image rendering unit 123 into predetermined units. The validity flag generation unit 124 further stores the generated validity flag in the validity flag storage unit 127 in accordance with the control of the memory control unit 125.

The validity flag is information indicating whether or not the corresponding block image has a pixel value to be rendered (i.e., valid pixel value). That is, the validity flag serves as rendering determination information, and the validity flag generation unit 124 functions as a rendering determination information generation unit.

Figure 6:
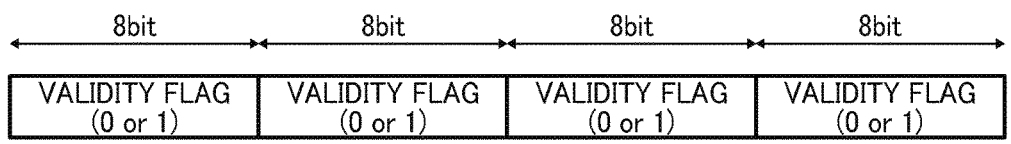
FIG. 6 is a diagram illustrating an example format of validity flags generated by a validity flag generation unit in the main control unit according to the embodiment.

FIG. 6 is a diagram illustrating an example format of the validity flag generated by the validity flag generation unit 124. As illustrated in FIG. 6, the validity flag is formed of 8 bits, for example, for each of the block images, and represents a value "0" or "1." These values 0 and 1 of the validity flag are illustrative. Thus, the validity flag may include any information allowing determination of whether or not the corresponding block image has a pixel value to be rendered.

Since the validity flag represents the value "0" or "1" in the present example, 1 bit is sufficient. However, software control involves bit shift, which delays the generation of the validity flag. To facilitate the generation of the validity flag by the validity flag generation unit 124, therefore, each validity flag is formed of 8 bits. Details of the validity flag generation process by the validity flag generation unit 124 will be described later.

The memory control unit 125 controls the access of the multivalued image rendering unit 123 and the validity flag generation unit 124 to the RAM 20. The data communication unit 128 receives requests from the image processing unit 104 and transmits necessary information to the image processing unit 104 via a bus such as Peripheral Component Interconnect Express (PCI Express; registered trademark).

Specifically, for example, in response to a validity flag transmission request from the image processing unit 104, the data communication unit 128 acquires the validity flags stored in the validity flag storage unit 127 and transmits the validity flags to the image processing unit 104 in accordance with the control of the memory control unit 125. Further, for example, in response to an RGB image transmission request from the image processing unit 104, the data communication unit 128 transmits the RGB image stored in the multivalued image storage unit 126 to the image processing unit 104 in accordance with the control of the memory control unit 125.

The multivalued image storage unit 126 is a memory for storing the RGB image in a storage area allocated in the RAM 20. The validity flag storage unit 127 is a memory for storing, in a storage area allocated in the RAM 20, the validity flags for the divided block images of the RGB image stored in the multivalued image storage unit 126.

FIG. 7 is a diagram illustrating an example of the RGB image stored in the multivalued image storage unit 126. The RGB image illustrated in FIG. 7 is formed of 24 by 3 pixels. The position of each of the pixels is represented by information of coordinates (X, Y). In the present embodiment, units of access to the RAM 20 serving as the main memory correspond to units of a predetermined number of pixels (e.g., units of 8 pixels) in one horizontal line, and the RGB image is divided into the units of the predetermined number of pixels to generate the plurality of block images. For example, each of the block images is formed of 8 pixels and enclosed by thick lines in FIG. 7. That is, the RGB image illustrated in FIG. 7 is divided into 9 block images.

FIG. 8 is a diagram illustrating an example of the validity flags stored in the validity flag storage unit 127. The validity flags illustrated in FIG. 8 correspond to the block images of the RGB image illustrated in FIG. 7. As illustrated in FIG. 8, the validity flags are stored in the validity flag storage unit 127 for the respective 8-pixel block images.

FIG. 9 is a diagram illustrating another example of the RGB image stored in the multivalued image storage unit 126. The RGB image illustrated in FIG. 9 is formed of 20 by 3 pixels. The position of each of the pixels is represented by information of coordinates (X, Y). In the RGB image illustrated in FIG. 9, the number of pixels in each of horizontal lines is not a multiple of the unit of a predetermined number of pixels (8 pixels in this example). Therefore, invalid data "no operation" (NOP) is added to the end of each of the horizontal lines such that the number of pixels forming the horizontal line is a multiple of 8. That is, the RGB image illustrated in FIG. 9 is divided into 9 block images enclosed by thick lines similarly to the RGB image illustrated in FIG. 7.

FIG. 10 is a diagram illustrating another example of the validity flags stored in the validity flag storage unit 127. The validity flags illustrated in FIG. 10 correspond to the block images of the RGB image illustrated in FIG. 9. As illustrated in FIG. 10, the validity flags are stored in the validity flag storage unit 127 for the respective block images. As illustrated in FIG. 9, in the last block image in each of the horizontal lines, four pixels at the end have the invalid data NOP. The validity flags are therefore generated for the four pixels at the beginning of the horizontal line.

Details of the validity flag generation process by the validity flag generation unit 124 will now be described.

Figure 11:
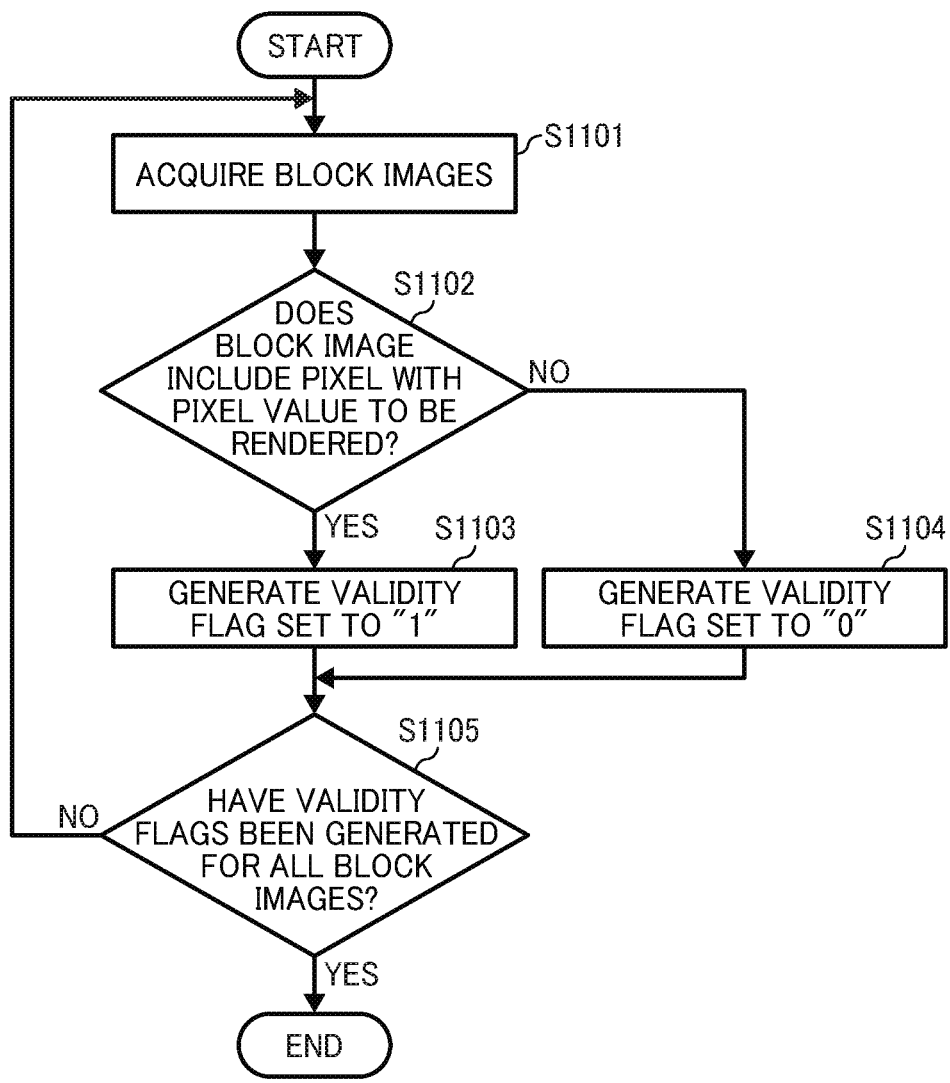
FIG. 11 is a flowchart illustrating an example of a validity flag generation process performed by the validity flag generation unit according to the embodiment.

FIG. 11 is a flowchart illustrating an example of the validity flag generation process by the validity flag generation unit 124. As illustrated in FIG. 11, the validity flag generation unit 124 acquires the block images of the RGB image based on the image configuration information input from the PDL analysis unit 122 (step S1101). Specifically, the validity flag generation unit 124 acquires the block images by acquiring, in units of 8 pixels, the pixels at the respective positions of the pixels represented by the image configuration information.

Having acquired the block images, the validity flag generation unit 124 determines whether or not each of the acquired block images includes a pixel having a pixel value to be rendered (step S1102). The pixel value to be rendered is other than a pixel value representing background color (i.e., invalid pixel value), and is the value of a pixel rendered in the image forming and outputting operation. The background color refers to the color of a portion of the sheet in which the image is not rendered in the image forming and outputting operation, and is white color in the present embodiment.

If the acquired block image includes a pixel having a pixel value to be rendered (YES at step S1102), the validity flag generation unit 124 generates a validity flag set to the value "1" for the acquired block image (step S1103). If the acquired block image is formed entirely of pixels of the background color (NO at step S1102), the validity flag generation unit 124 generates a validity flag set to the value "0" for the acquired block image (step S1104).

Having generated the validity flag for the acquired block image, the validity flag generation unit 124 determines whether or not the validity flags for all block images forming the RGB image have been generated (step S1105). If the validity flags for all block images forming the RGB image have been generated (YES at step S1105), the validity flag generation unit 124 completes the validity flag generation process. If the validity flags for all block images forming the RGB image have not been generated (NO at step S1105), the validity flag generation unit 124 acquires any block image for which the validity flag has not been generated (step S1101), and repeats the processes of the subsequent steps.

Figure 12:
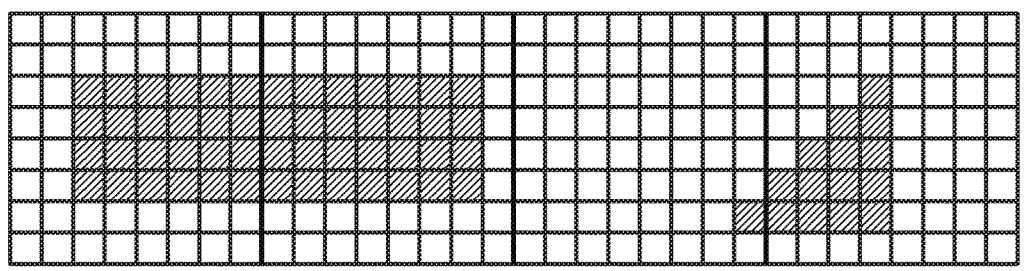
FIG. 12 is a diagram illustrating an example of the RGB image according to the embodiment.
Figure 13:
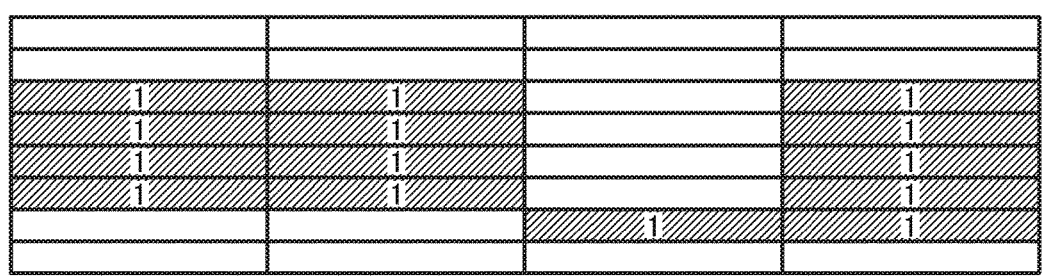
FIG. 13 is a diagram illustrating an example of the validity flags according to the embodiment.

FIG. 12 is a diagram illustrating an example of the RGB image. FIG. 13 is a diagram illustrating an example of the validity flags generated for the block images of the RGB image illustrated in FIG. 12. Each of squares illustrated in FIG. 12 represents one pixel. Hatched squares represent pixels having a pixel value to be rendered, and the remaining squares represent pixels of the background color. That is, the RGB image illustrated in FIG. 12 is formed of 32 by 8 pixels, and includes 32 block images obtained by dividing each of horizontal lines of the RGB image into units of 8 pixels indicated by thick lines.

As illustrated in FIG. 13, 32 validity flags are generated for the 32 block images. The respective positions of the validity flags correspond to the respective positions of the block images illustrated in FIG. 12. Hatched validity flags represent the value "1," and the remaining validity flags represent the value "0." The block images including any hatched pixel in the RGB image illustrated in FIG. 12 correspond to the validity flag representing the value "1."

A description will now be given of a function of the image processing unit 104 according to the embodiment related to the acquisition of the RGB image and the generation of the rendering information.

Figure 14:
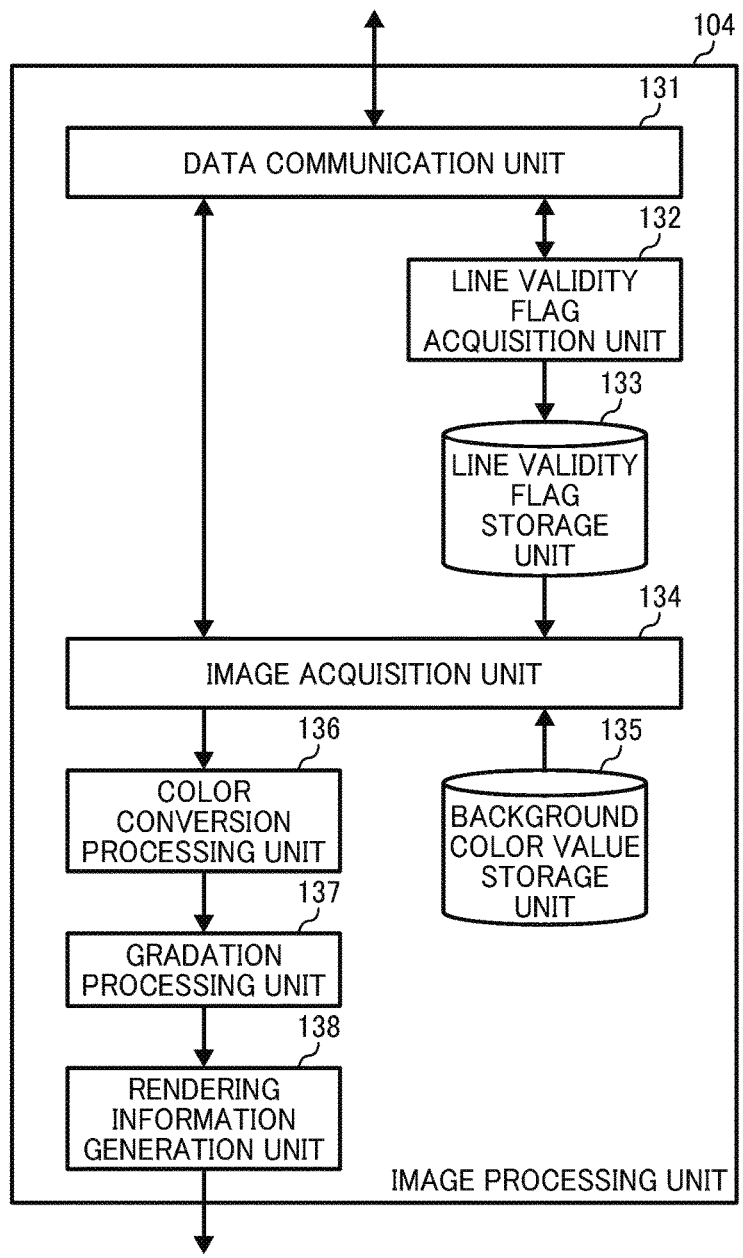
FIG. 14 is a diagram illustrating an example functional configuration of an image processing unit in the image processing apparatus according to the embodiment.

FIG. 14 is a block diagram illustrating an example functional configuration of the image processing unit 104 according to the embodiment related to the acquisition of the RGB image and the generation of the rendering information.

As illustrated in FIG. 14, the image processing unit 104 according to the embodiment includes a data communication unit 131, a line validity flag acquisition unit 132, a line validity flag storage unit 133, an image acquisition unit 134, a background color value storage unit 135, a color conversion processing unit 136, a gradation processing unit 137, and a rendering information generation unit 138.

The data communication unit 131 transmits requests to the main control unit 101 or receives necessary information from the main control unit 101 via a bus such as PCI Express. Specifically, for example, the data communication unit 131 transmits a validity flag acquisition request from the line validity flag acquisition unit 132 to the main control unit 101, receives the validity flags transmitted from the main control unit 101 in response to the validity flag acquisition request, and outputs the validity flags to the line validity flag acquisition unit 132.

Further, for example, the data communication unit 131 transmits an RGB image acquisition request from the image acquisition unit 134 to the main control unit 101, receives the RGB image transmitted from the main control unit 101 in response to the RGB image acquisition request, and outputs the RGB image to the image acquisition unit 134. The data communication unit 131 further receives image processing parameters stored in the RAM 20. The image processing parameters are information representing the vertical and horizontal sizes of the RGB image, the position of a read start pixel of the RGB image, the vertical and horizontal sizes of the validity flags, the position of a read start pixel of the validity flags, and so forth. The image processing parameters received by the data communication unit 131 are used in processes performed by the units of the image processing unit 104.

The line validity flag acquisition unit 132 outputs to the data communication unit 131 a request to acquire the validity flags for one horizontal line of the RGB image, and acquires the validity flags for the one horizontal line (hereinafter referred to as the line validity flags) input from the data communication unit 131. The line validity flag acquisition unit 132 further stores the acquired line validity flags for the one horizontal line in the line validity flag storage unit 133.

The line validity flag storage unit 133 is a storage area allocated in a memory included in an ASIC or the like forming the image processing unit 104, and stores the line validity flags acquired by the line validity flag acquisition unit 132.

Based on the line validity flags stored in the line validity flag storage unit 133, the image acquisition unit 134 outputs the RGB image acquisition request to the data communication unit 131, and acquires the RGB image input from the data communication unit 131. Further, based on the line validity flags stored in the line validity flag storage unit 133, the image acquisition unit 134 acquires an image formed with a color value stored in the background color value storage unit 135 as the RGB image. The above-described image acquisition process by the image acquisition unit 134 will be described in detail later.

The image acquisition unit 134 further outputs the acquired RGB image to the color conversion processing unit 136. The background color value storage unit 135 is a storage area allocated in a memory included in an ASIC or the like forming the image processing unit 104, and stores the color value predetermined as representing the background color. For example, in the present embodiment, the background color value storage unit 135 stores the color value of white color as the background color.

The color conversion processing unit 136 converts the color expression format of the RGB image input from the image acquisition unit 134 to generate an image in cyan, magenta, yellow, key plate (CMYK) format. The color conversion processing unit 136 further outputs the generated CMYK-format image to the gradation processing unit 137.

The gradation processing unit 137 performs gradation processing on the CMYK-format image input from the color conversion processing unit 136 to generate a few-value CMYK plain image, and outputs the few-value CMYK plain image to the rendering information generation unit 138.

Figure 15:
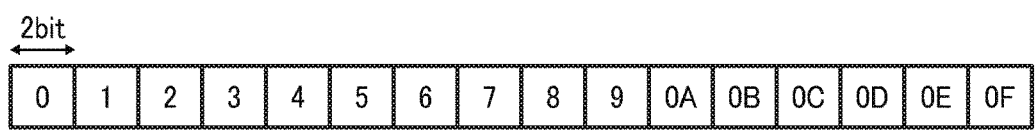
FIG. 15 is a diagram illustrating an example format of a few-value CMYK plain image according to the embodiment.

FIG. 15 is a diagram illustrating an example format of the few-value CMYK plain image generated by the gradation processing unit 137. As illustrated in FIG. 15, each of colors in the few-value CMYK plain image is represented by 2 bits, for example. The few-value CMYK plain image will hereinafter be referred to as the CMYK image.

The rendering information generation unit 138 acquires the CMYK image input from the gradation processing unit 137, generates the rendering information including plural lines of CMYK images, and outputs the rendering information to the print engine 115 in accordance with the control of the engine control unit 102.

The RGB image acquisition process by the image acquisition unit 134 will now be described in detail.

Figure 16:
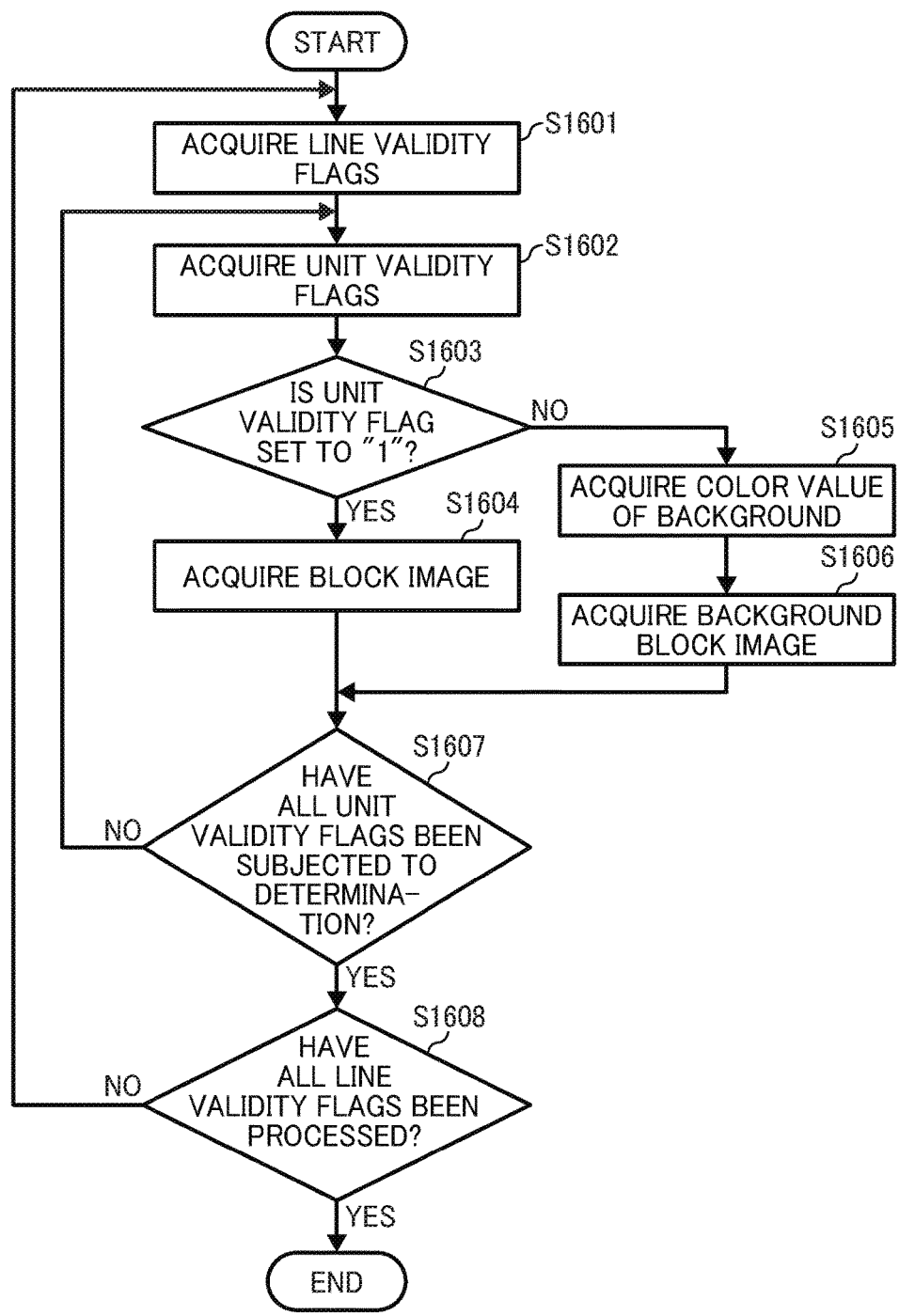
FIG. 16 is a flowchart illustrating an example of an RGB image acquisition process performed by an image acquisition unit in the image processing unit according to the embodiment.

FIG. 16 is a flowchart illustrating an example of the RGB image acquisition process by the image acquisition unit 134. As illustrated in FIG. 16, the image acquisition unit 134 acquires the line validity flags stored in the line validity flag storage unit 133 (step S1601).

Having acquired the line validity flags, the image acquisition unit 134 acquires the validity flags for the memory access units (i.e., units of 8 pixels in the present embodiment) (hereinafter referred to as the unit validity flags) from each of the acquired line validity flags (step S1602). For example, if the validity flags illustrated in FIG. 13 are stored in the validity flag storage unit 127, each of the line validity flags stored in the line validity flag storage unit 133 is formed of four unit validity flags. That is, one unit validity flag corresponds to one validity flag generated by the validity flag generation unit 124.

Having acquired the unit validity flags, the image acquisition unit 134 determines whether or not each of the acquired unit validity flags is set to the value "1" (step S1603). If the acquired unit validity flag is set to the value "1" (YES at step S1603), the image acquisition unit 134 acquires the block image of the RGB image corresponding to the unit validity flag from the multivalued image storage unit 126 in the RAM 20 (step S1604).

If the acquired unit validity flag is not set to the value "1," i.e., if the acquired unit validity flag is set to the value "0" (NO at step S1603), the image acquisition unit 134 acquires the color value of the background stored in the background color value storage unit 135 (step S1605). This is because, in this case, the block image corresponding to the unit validity flag only includes the background. Having acquired the color value of the background, the image acquisition unit 134 acquires, as the block image corresponding to the unit validity flag, a block image with the color value of the background having the pixel values of the pixels thereof acquired (step S1606).

Having acquired the block image, the image acquisition unit 134 determines whether or not all unit validity flags forming the acquired line validity flag have been subjected to the above-described determination of step S1603 (step S1607). If any of the unit validity flags has not been subjected to the determination (NO at step S1607), the image acquisition unit 134 acquires the unit validity flag not subjected to the determination (step S1602), and repeats the processes of the subsequent steps.

If all unit validity flags forming the acquired line validity flag have been subjected to the determination (YES at step S1607), the image acquisition unit 134 determines whether or not all line validity flags have been processed (step S1608). If all line validity flags have been processed (YES at step S1608), the image acquisition unit 134 completes the RGB image acquisition process. If any of the line validity flags has not been processed (NO at step S1608), the image acquisition unit 134 acquires the unprocessed line validity flag from the main control unit 101 (step S1601), and repeats the processes of the subsequent steps.

Figures 17, 18:
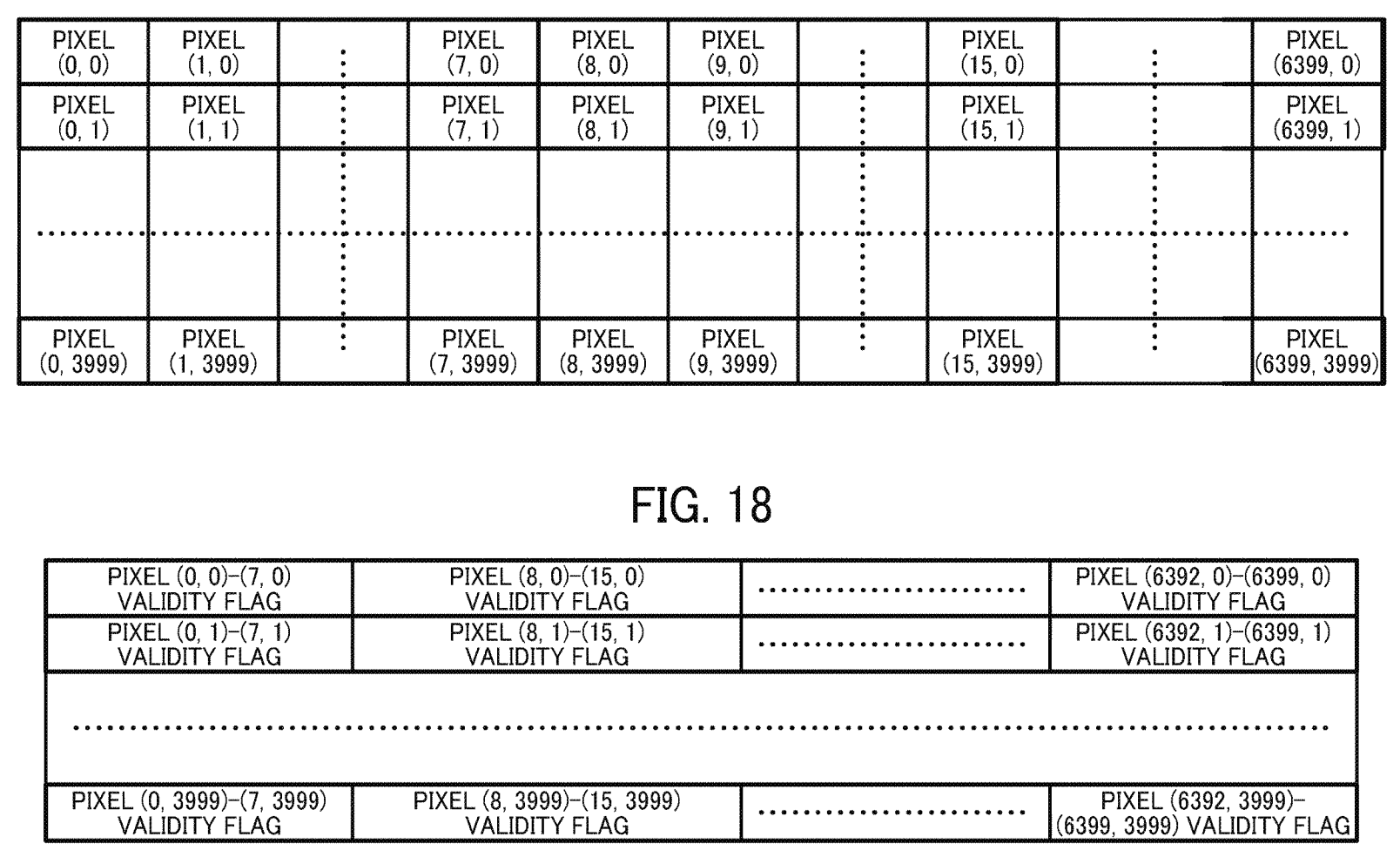

FIG. 17 is a diagram illustrating an example of the RGB image processed by the image processing apparatus 1 with a resolution of 600 dpi. FIG. 18 is a diagram illustrating an example of the validity flags corresponding to the block images of the RGB image illustrated in FIG. 17. The RGB image illustrated in FIG. 17 is formed of 6400 by 4000 pixels. The validity flags illustrated in FIG. 18 are generated for the 8-pixel block images enclosed by thick lines.

As to the validity flags illustrated in FIG. 18, the line validity flag acquisition unit 132 acquires the line validity flags for the respective horizontal lines enclosed by thick lines. Then, the image acquisition unit 134 acquires the unit validity flags for the respective block images forming each of the acquired line validity flags. Thereby, the above-described image acquisition process is performed.

Figure 19:
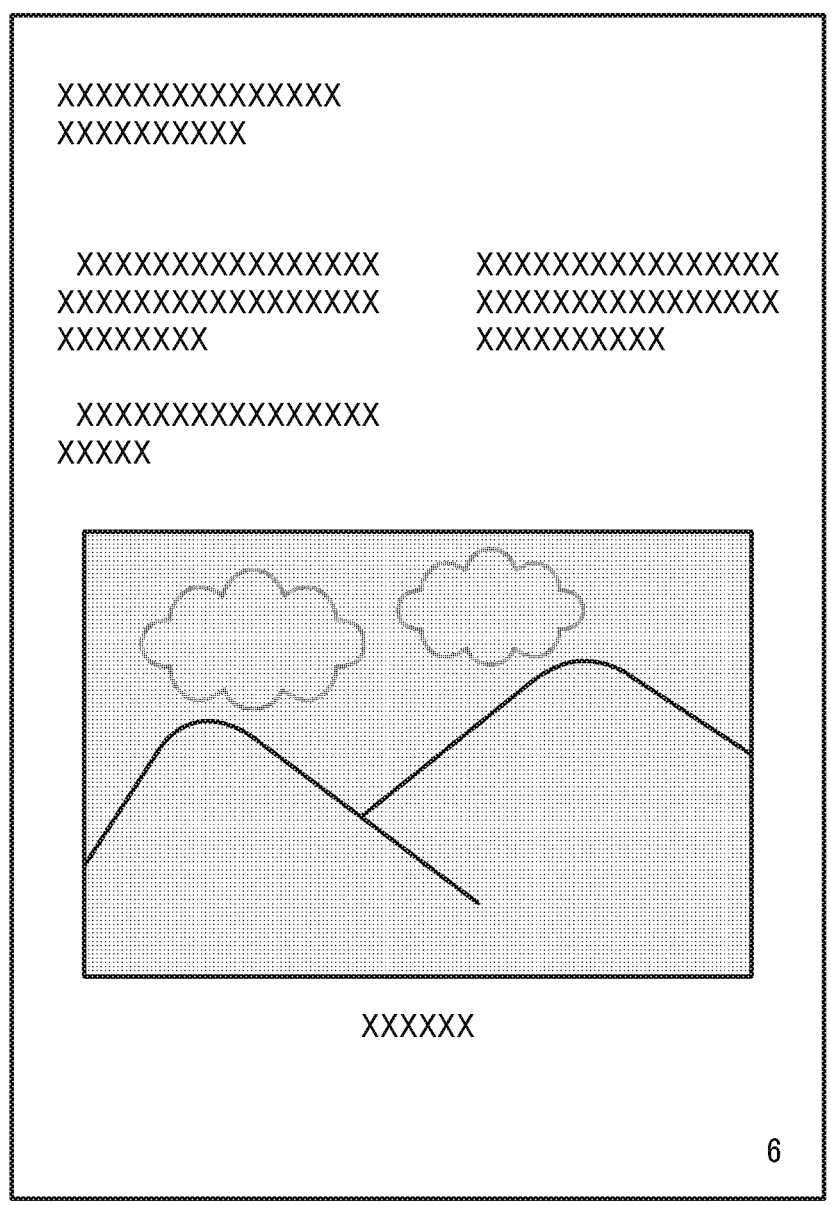
FIG. 19 is a diagram illustrating an example of the RGB image to be formed and output according to the embodiment.
Figure 20:
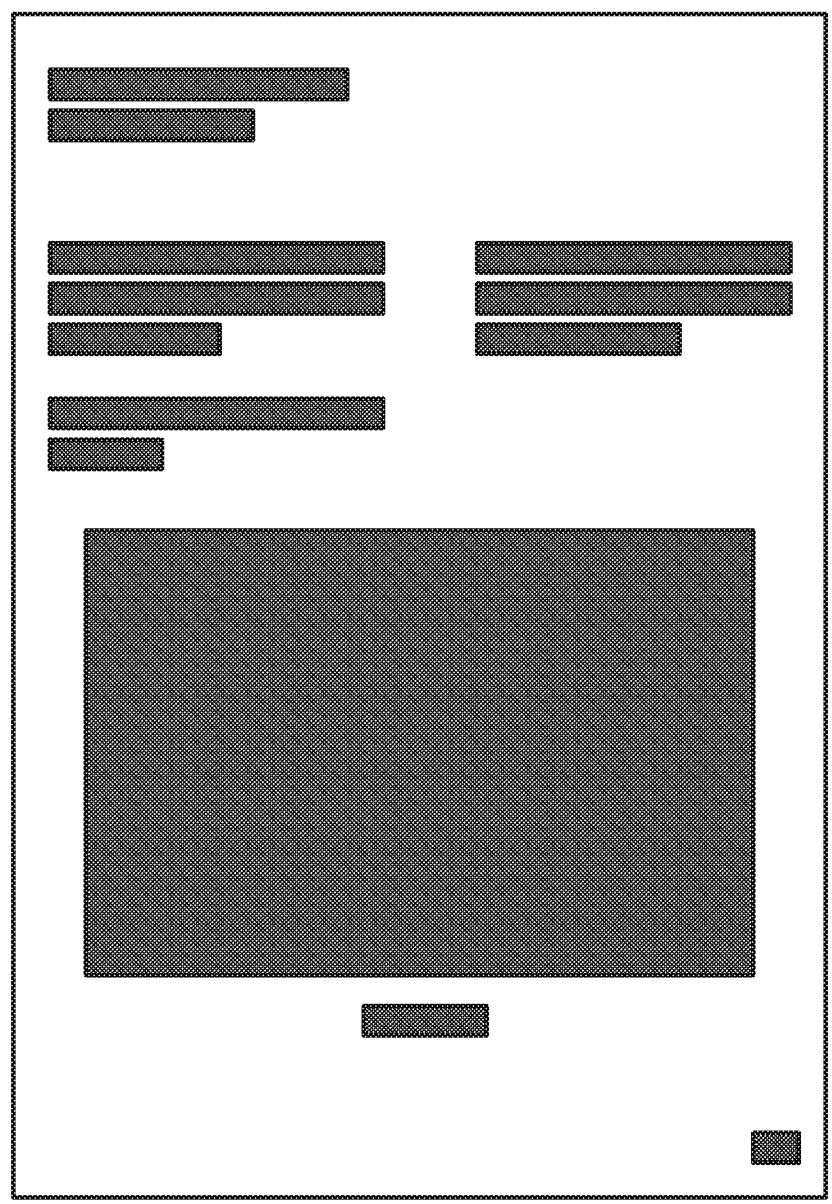
FIG. 20 is a diagram illustrating an example of acquisition of the RGB image by the image acquisition unit according to the embodiment.

FIG. 19 is a diagram illustrating an example of the RGB image to be formed and output. FIG. 20 is a diagram illustrating an example of acquisition of the RGB image illustrated in FIG. 19 by the image acquisition unit 134. As illustrated in FIG. 19, pixels forming text images, a picture or photo image, and an image representing the page number are rendered as the RGB image, and no pixel is rendered in the remaining portion of the background color.

In FIG. 20, the pixels illustrated in FIG. 19 are rendered as hatched portions, and the remaining portion forms the background. That is, the image acquisition unit 134 acquires the block images corresponding to the hatched portions from the RAM 20 via the bus 80, and acquires the image of the remaining portion not from the RAM 20 but as block images formed with the color value of the background. As illustrated in FIG. 20, the image acquisition unit 134 is not required to acquire all block images of the RGB image from the RAM 20 via the bus 80. Accordingly, the data amount transferred via the bus 80 is reduced.

As described above, the image processing apparatus 1 according to the embodiment first acquires the validity flags generated for the respective block images, and determines whether or not each of the block images includes a pixel having a pixel value to be rendered based on the validity flags. The image processing apparatus 1 then acquires only the block images including a pixel having a pixel value to be rendered from the RAM 20 serving as the main memory via the bus 80. Thereby, the amount of image data transferred via the bus 80 to form and output an image is reduced.

Accordingly, the image data transferred via the bus 80 to form and output an image is acquired and subjected to image processing at high speed.

The above-described embodiment uses the memory access units of 8 pixels. This is only illustrative, and thus the memory access units may have any size allowing efficient data transfer via a bus. For example, if the RGB image is in 32-bit format, the number of pixels in the memory access unit may be 4 or 16, an even multiple of which is 32.

Figure 21:
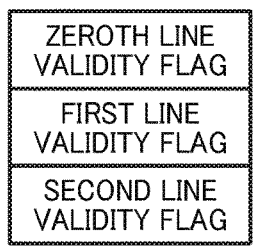
FIG. 21 is a diagram illustrating an example of the validity flags according to the embodiment.

Further, in the above-described embodiment, the block images are formed in the units of 8 pixels in each of the horizontal lines. Alternatively, the block images may be formed in units of horizontal lines. FIG. 21 is a diagram illustrating an example of the validity flags for the block images formed in the units of horizontal lines. In this example, the validity flag is generated for each of the block images formed in the units of horizontal lines. As illustrated in FIG. 21, therefore, the validity flags are generated for the respective horizontal lines of the RGB image.

Figure 22:
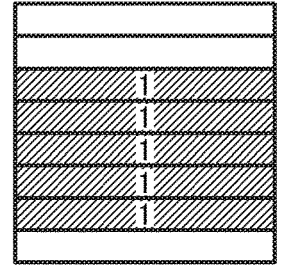
FIG. 22 is a diagram illustrating an example of the validity flags according to the embodiment.

FIG. 22 is a diagram illustrating an example of the validity flags generated for respective block images obtained by dividing the RGB image illustrated in FIG. 12 into the units of horizontal lines. As illustrated in FIG. 12, in the RGB image formed of 8 horizontal lines (i.e., zeroth to seventh lines), block images on the second to sixth lines include a pixel having a pixel value to be rendered. As illustrated in FIG. 22, therefore, the validity flags on the second to sixth lines are set to the value "1."

Figure 23:
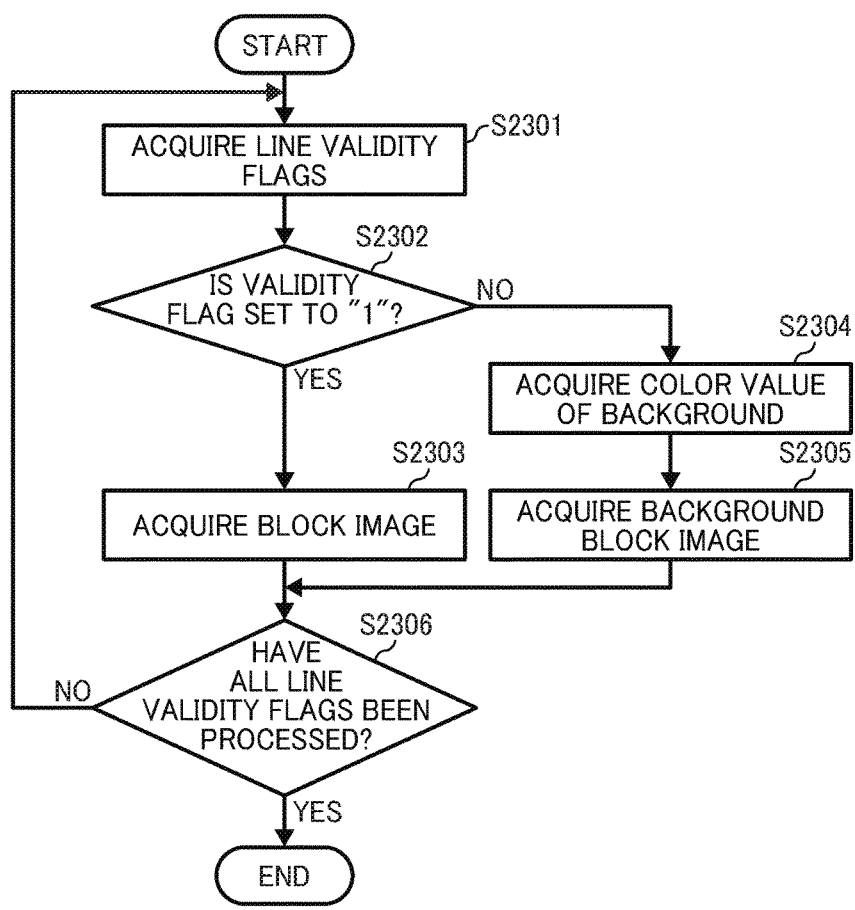
FIG. 23 is a flowchart illustrating an example of the RGB image acquisition process performed by the image acquisition unit according to the embodiment.

FIG. 23 is a flowchart illustrating an example of the RGB image acquisition process by the image acquisition unit 134, in which the block images are formed in the units of horizontal lines. As illustrated in FIG. 23, the image acquisition unit 134 acquires the line validity flags stored in the line validity flag storage unit 133 (step S2301). Herein, each of the acquired line validity flags is generated for one block image.

Having acquired the line validity flags, the image acquisition unit 134 determines whether or not each of the acquired line validity flags is set to the value "1" (step S2302). If the acquired validity flag is set to the value "1" (YES at step S2302), the image acquisition unit 134 acquires the block image of the RGB image corresponding to the line validity flag from the multivalued image storage unit 126 in the RAM 20 (step S2303).

If the acquired line validity flag is set to the value "0" (NO at step S2302), the image acquisition unit 134 acquires the color value of the background stored in the background color value storage unit 135 (step S2304). Having acquired the color value of the background, the image acquisition unit 134 acquires, as the block image corresponding to the line validity flag, a block image with the color value of the background having the pixel values of the pixels thereof acquired (step S2305).

Having acquired the block image, the image acquisition unit 134 determines whether or not all line validity flags have been processed (step S2306). If all line validity flags have been processed (YES at step S2306), the image acquisition unit 134 completes the RGB image acquisition process. If any of the line validity flags has not been processed (NO at step S2306), the image acquisition unit 134 acquires the unprocessed line validity flag from the main control unit 101 (step S2301), and repeats the processes of the subsequent steps.

Figure 24:
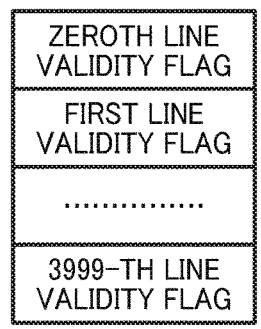
FIG. 24 is a diagram illustrating an example of the validity flags according to the embodiment.

FIG. 24 is a diagram illustrating an example of the validity flags corresponding to the block images formed in the units of horizontal lines in the RGB image of 6400 by 4000 pixels processed by the image processing apparatus 1 with a resolution of 600 dpi. As illustrated in FIG. 24, when the validity flag is generated for each of the block images formed in the units of horizontal lines, 3999 validity flags are generated for 3999 lines.

Figure 25:
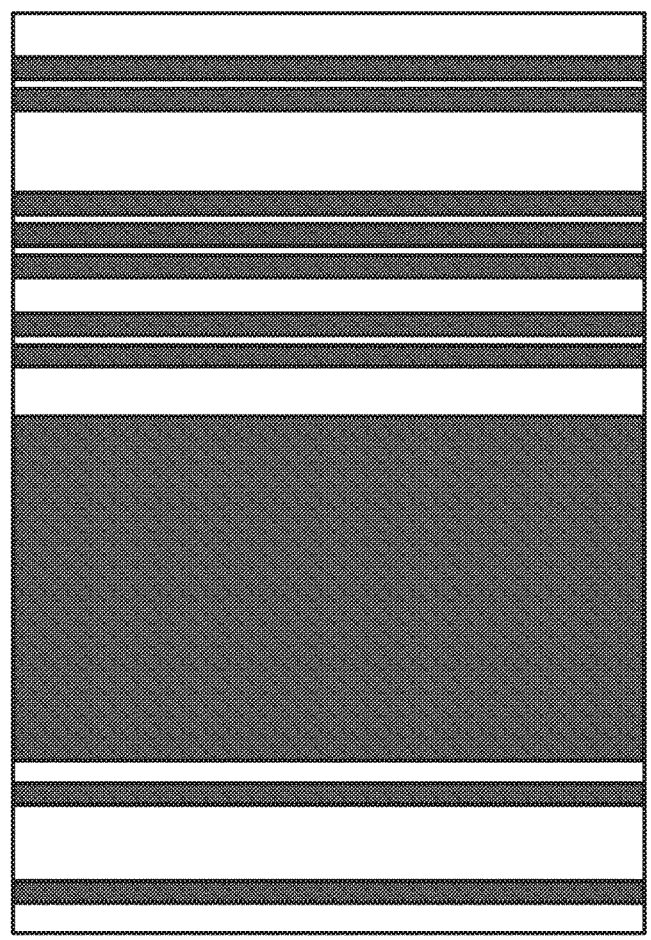
FIG. 25 is a diagram illustrating an example of acquisition of the RGB image by the image acquisition unit according to the embodiment.

FIG. 25 is a diagram illustrating an example of acquisition of the RGB image illustrated in FIG. 19 by the image acquisition unit 134 based on the validity flags corresponding to the block images formed in the units of horizontal lines. As illustrated in FIG. 25, hatched portions are block images acquired from the RAM 20 via the bus 80. Unlike the example illustrated in FIG. 20, if any of the pixels forming a horizontal line of the RGB image has a pixel value to be rendered, the entire horizontal line of the RGB image is acquired from the RAM 20 via the bus 80.

When the block images are formed in the memory access units in the horizontal lines, the number of block images forming each of the horizontal lines is larger than that when the block images are formed in the units of horizontal lines. In this case, therefore, whether or not to acquire the RGB image from the RAM 20 is determined in smaller units. As illustrated in FIG. 20, therefore, the data amount of the RGB image acquired from the RAM 20 is smaller than that of the example in FIG. 25. Accordingly, the larger the number of block images forming each of the horizontal lines is, the faster the image acquisition unit 134 may acquire the image data.

Contrastively, when the block images are formed in the units of horizontal lines, the number of generated validity flags is smaller than that when the block images are formed in the memory access units. In this case, therefore, the load on the validity flag generation unit 124 in the validity flag generation process and the load on the image acquisition unit 134 in the validity flag determination process are less than that when the block images are formed in the memory access units.

As described above, the image data amount transferred via the bus and the processing load on the units vary depending on the divided units of the RGB image. The divided units of the RGB image, therefore, may be determined in accordance with the performance of the image processing apparatus 1, such as the speed of data transfer via the bus and the processing capacity. With this configuration, the RGB image is divided into appropriate units in accordance with the performance of the image processing apparatus 1.

Further, in the above-described example, the line validity flag acquisition unit 132 acquires the line validity flags in the units of horizontal lines. However, this is only illustrative. Thus, the number of validity flags acquired at one time by the line validity flag acquisition unit 132 may be set in accordance with the number of validity flags forming each of the horizontal lines or the speed of data transfer via the bus. With this configuration, the validity flags stored in the RAM 20 are efficiently transferred to the image processing unit 104.

Further, in the above-described example, the background has white color. However, this is only illustrative. Thus, the color value stored in the background color value storage unit 135 may be set in accordance with the background color of the recording medium onto which the image is formed and output. Further, the color value of the most dominant one of the colors forming the image to be formed and output onto the recording medium may be stored in the background color value storage unit 135 as the color value of the background color.

In this case, for example, the multivalued image rendering unit 123 may render the RGB image by counting the number of pixels for each of the pixel values and outputting the pixel value largest in the number of pixels (i.e., the pixel value occurring most frequently in the pixels forming the RGB image) to the image processing unit 104 as the pixel value of the background color. Then, the image processing unit 104 may store the color value in the background color value storage unit 135 based on the pixel value input from the multivalued image rendering unit 123. This configuration allows the use of the color value according to the actual background, without limiting the background to white color, thereby accurately forming and outputting an intended image.

In the transfer of a multivalued image via a bus to form and output an image on a recording medium, it usually times time from issuance of a request for the multivalued image to acquisition of the multivalued image by an image processing ASIC owing to a large data amount of the multivalued image, consequently increasing the time until the completion of image processing on the multivalued image and the formation and output of the image.

According to this disclosure, however, image data for forming and outputting an image on a recording medium is acquired and subjected to image processing at high speed.

Numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. Further, the above-described steps are not limited to the order disclosed herein. It is therefore to be understood that, within the scope of the appended claims, this disclosure may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

This disclosure can be implemented in any convenient form, for example using dedicated hardware, or a mixture of dedicated hardware and software. This disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since this disclosure can be implemented as software, each and every aspect of this disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile storage medium. The HDD may be implemented by any desired kind of non-volatile storage medium capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An image processing apparatus comprising:
   memory to store a target image;
   a control circuit to determine a pixel value occurring most frequently in the target image, to divide the target image into predetermined units to generate a plurality of block images, to generate rendering determination information for each of the plurality of block images, and to store the rendering determination information in the memory, the rendering determination information indicating whether or not each of the plurality of block images includes the pixel value occurring most frequently; and
   an image processing circuit coupled to the control circuit via a bus, the image processing circuit implementing a storage unit to store the pixel value occurring most frequently, to acquire the generated rendering determination information for a block image of the target image from the memory, to acquire the block image by issuing a request to the control circuit to transfer the block image from the memory via the bus if the rendering determination information does not indicate that the block image has the pixel value occurring most frequently, to acquire the block image by accessing the storage unit to retrieve the pixel value occurring most frequently if the rendering determination information indicates that the block image has the pixel value occurring most frequently, and to generate rendering information for rendering the target image based on acquired block images.

2. The image processing apparatus of claim 1, wherein the memory is implemented in Random Access Memory (RAM), the storage unit is implemented in an Application Specific Integrated Circuit (ASIC) of the image processing circuit, and the image processing circuit is configured to perform color conversion and gradation processing on the target image for printing the target image with a print engine.

3. The image processing apparatus of claim 1, wherein the target image is a multivalued image in red, green, and blue (RGB).

4. The image processing apparatus of claim 1, wherein the pixel value occurring most frequently in the target image is a background color on a sheet to be marked with the target image.

5. The image processing apparatus of claim 1, wherein the predetermined units are units of a predetermined number of pixels forming a horizontal line.

6. The image processing apparatus of claim 1, wherein the predetermined units are units of horizontal lines.

7. The image processing apparatus of claim 1, wherein the predetermined units are set in accordance with performance of the image processing apparatus.

8. A method of controlling an image processing apparatus, the method comprising:
   storing a target image in memory;
   determining, with a control circuit, a pixel value occurring most frequently in the target image;
   dividing the target image into predetermined units to generate a plurality of block images;
   generating, for each of the plurality of block images, rendering determination information indicating whether or not each of the plurality of block images includes the pixel value occurring most frequently;
   storing the rendering determination information in the memory;
   storing the pixel value occurring most frequently in a storage unit of an image processing circuit coupled to the control circuit via a bus;
   acquiring, with the image processing circuit, the generated rendering determination information for a block image of the target image from the memory;
   acquiring, with the image processing circuit, the block image by issuing a request to the control circuit to transfer the block image from the memory via the bus if the rendering determination information does not indicate that the block image has the pixel value occurring most frequently;
   acquiring the block image by accessing the storage unit if the rendering determination information indicates that the block image has the pixel value occurring most frequently; and
   generating rendering information for rendering the target image based on acquired block images.

9. The method of controlling an image processing apparatus of claim 8, wherein:
   the memory is implemented in Random Access Memory (RAM);
   the storage unit is implemented in an Application Specific Integrated Circuit (ASIC) of the image processing circuit; and
   the method further comprises performing, with the image processing circuit, color conversion and gradation processing on the target image for printing the target image with a print engine.

10. The method of controlling an image processing apparatus of claim 8, wherein:
    the target image is a multivalued image in red, green, and blue (RGB).

11. The method of controlling an image processing apparatus of claim 8, wherein:
    the pixel value occurring most frequently in the target image is a background color on a sheet to be marked with the target image.

12. The method of controlling an image processing apparatus of claim 8, further comprising:
    setting the predetermined units to units of a predetermined number of pixels forming a horizontal line.

13. The method of controlling an image processing apparatus of claim 8, further comprising:
    setting the predetermined units to units of horizontal lines.

14. The method of controlling an image processing apparatus of claim 8, further comprising:
    setting the predetermined units in accordance with performance of the image processing apparatus.

15. A non-transitory recording medium storing a program for causing a computer to execute a method of controlling an image processing apparatus, the method comprising:
    storing a target image in memory;
    determining, with a control circuit, a pixel value occurring most frequently in the target image;
    dividing the target image into predetermined units to generate a plurality of block images;

generating, for each of the plurality of block images, rendering determination information indicating whether or not each of the plurality of block images includes the pixel value occurring most frequently;

storing the rendering determination information in the memory;

storing the pixel value occurring most frequently in a storage unit of an image processing circuit coupled to the control circuit via a bus;

acquiring, with the image processing circuit, the generated rendering determination information for a block image of the target image from the memory;

acquiring, with the image processing circuit, the block image by issuing a request to the control circuit to transfer the block image from the memory via the bus if the rendering determination information does not indicate that the block image has the pixel value occurring most frequently;

acquiring the block image by accessing the storage unit if the rendering determination information indicates that the block image has the pixel value occurring most frequently; and generating rendering information for rendering the target image based on acquired block images.

* * * * *